(12) United States Patent
Schmidt

(10) Patent No.: US 10,366,335 B2
(45) Date of Patent: Jul. 30, 2019

(54) SYSTEMS AND METHODS FOR SYMBOLIC ANALYSIS

(71) Applicant: DataRobot, Inc., Boston, MA (US)

(72) Inventor: Michael Schmidt, Boston, MA (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 14/016,300

(22) Filed: Sep. 3, 2013

(65) Prior Publication Data

US 2014/0172773 A1 Jun. 19, 2014

Related U.S. Application Data

(60) Provisional application No. 61/695,637, filed on Aug. 31, 2012, provisional application No. 61/695,660, filed on Aug. 31, 2012.

(51) Int. Cl.
*G06N 7/00* (2006.01)
*G06F 16/248* (2019.01)
*G06F 16/245* (2019.01)
*G06F 16/2457* (2019.01)

(52) U.S. Cl.
CPC .............. *G06N 7/00* (2013.01); *G06F 16/248* (2019.01); *G06F 16/24578* (2019.01)

(58) Field of Classification Search
CPC .............. G06N 3/126; G06N 7/00; G06N 7/08
See application file for complete search history.

(56) References Cited

U.S. PATENT DOCUMENTS

| 5,761,442 A | 6/1998 | Barr et al. |
| 7,072,863 B1 | 7/2006 | Phillips et al. |
| 7,117,185 B1 | 10/2006 | Aliferis et al. |
| 7,580,852 B2 | 8/2009 | Ouimet et al. |
| 8,024,216 B2 | 9/2011 | Aronowich et al. |
| 8,180,664 B2 | 5/2012 | Shan |

(Continued)

FOREIGN PATENT DOCUMENTS

| JP | 2005-135287 A | 5/2005 |
| WO | WO-2010044683 A1 | 4/2010 |

OTHER PUBLICATIONS

Vladislavleva, E., et al. "Order of nonlinearity as a complexity measure for models generated by symbolic regression via pareto genetic programming." Evolutionary Computation, IEEE Transactions on 13.2 (2009): 333-349.*

(Continued)

*Primary Examiner* — Eric Nilsson
(74) *Attorney, Agent, or Firm* — Goodwin Procter LLP

(57) ABSTRACT

Systems and methods of searching for related data sets are provided. Multivariate data sets can be input as queries into a data set search engine. According to one embodiment, the input data set is automatically reduced to a set of best fit data models of minimum complexity that represent the data set. The data model is then compared to other data models to not only identify similarity between the models, but also to identify the particulars of why the data models are related. Similar data model results can be analyzed to determine the quality of each returned data model based on an information scores. These results can be displayed graphically as a topographical map of nodes and edge. Each node can represent a data model and each edge can reflect the similarity between the nodes.

39 Claims, 10 Drawing Sheets

(56) References Cited

U.S. PATENT DOCUMENTS

| | | | |
|---|---|---|---|
| 8,370,280 B1 | 2/2013 | Lin et al. | |
| 8,645,421 B2 | 2/2014 | Meric et al. | |
| 8,682,709 B2 | 3/2014 | Coldren et al. | |
| 8,782,037 B1 | 7/2014 | Barad et al. | |
| 8,843,427 B1 | 9/2014 | Lin et al. | |
| 9,489,630 B2 | 11/2016 | Achin et al. | |
| 9,495,641 B2 | 11/2016 | Schmidt | |
| 9,524,473 B2 | 12/2016 | Schmidt | |
| 9,652,714 B2 | 5/2017 | Achin et al. | |
| 9,659,254 B2 | 5/2017 | Achin et al. | |
| 10,102,483 B2 | 10/2018 | Schmidt | |
| 2002/0144178 A1 | 10/2002 | Castelli et al. | |
| 2004/0030777 A1 | 2/2004 | Reedy et al. | |
| 2004/0054997 A1 | 3/2004 | Katragadda et al. | |
| 2005/0183073 A1* | 8/2005 | Reynolds | G06F 8/30 717/141 |
| 2005/0234762 A1 | 10/2005 | Pinto et al. | |
| 2006/0101014 A1 | 5/2006 | Forman et al. | |
| 2006/0190285 A1 | 8/2006 | Harris et al. | |
| 2007/0133848 A1 | 6/2007 | McNutt et al. | |
| 2008/0059284 A1 | 3/2008 | Solotorevsky et al. | |
| 2008/0097802 A1 | 4/2008 | Ladde et al. | |
| 2008/0307399 A1 | 12/2008 | Zhou | |
| 2010/0131314 A1 | 5/2010 | Lo Yuk Ting et al. | |
| 2010/0312718 A1 | 12/2010 | Rosenthal | |
| 2011/0119100 A1 | 5/2011 | Ruhl et al. | |
| 2012/0078678 A1 | 3/2012 | Pradhan et al. | |
| 2012/0144325 A1 | 6/2012 | Mital et al. | |
| 2012/0192051 A1 | 7/2012 | Rothschiller et al. | |
| 2012/0202240 A1 | 8/2012 | Deigner et al. | |
| 2013/0073061 A1 | 3/2013 | Mu et al. | |
| 2013/0096892 A1 | 4/2013 | Essa et al. | |
| 2013/0290226 A1 | 10/2013 | Dokken | |
| 2014/0074829 A1 | 3/2014 | Schmidt | |
| 2014/0136452 A1 | 5/2014 | Wellman et al. | |
| 2014/0172773 A1 | 6/2014 | Schmidt | |
| 2014/0258189 A1 | 9/2014 | Schmidt | |
| 2014/0372172 A1 | 12/2014 | Frias Martinez et al. | |
| 2015/0088606 A1 | 3/2015 | Tyagi | |
| 2015/0317589 A1 | 11/2015 | Anderson et al. | |
| 2015/0339572 A1 | 11/2015 | Achin et al. | |
| 2015/0356576 A1 | 12/2015 | Malaviya et al. | |
| 2016/0005055 A1 | 1/2016 | Sarferaz | |
| 2016/0048766 A1 | 2/2016 | McMahon et al. | |
| 2016/0335550 A1 | 11/2016 | Achin et al. | |
| 2016/0364647 A1 | 12/2016 | Achin et al. | |
| 2016/0379244 A1 | 12/2016 | Kalish et al. | |
| 2017/0193398 A1 | 7/2017 | Schmidt | |
| 2017/0243140 A1 | 8/2017 | Achin et al. | |
| 2018/0046926 A1 | 2/2018 | Achin et al. | |
| 2018/0060738 A1 | 3/2018 | Achin et al. | |
| 2018/0060744 A1 | 3/2018 | Achin et al. | |
| 2018/0300737 A1 | 10/2018 | Bledsoe et al. | |

OTHER PUBLICATIONS

Mitra, S., et al. "Multi-objective evolutionary biclustering of gene expression data." Pattern Recognition 39.12 (2006): 2464-2477.*
Ekárt, A., et al. "A metric for genetic programs and fitness sharing." Genetic Programming. Springer Berlin Heidelberg, 2000. 259-270.*
Schmidt, Michael D. et al., "Automated refinement and inference of analytical models for metabolic networks," Aug. 10, 2011, Physical Biology, vol. 8, No. 5.
Schmidt, Michael et al., "Distilling Free-Form Natural Laws from Experimental Data," Apr. 3, 2009, Science, vol. 324, No. 5923, pp. 81-85.
U.S. Appl. No. 14/016,287, filed Sep. 3, 2013, Schmidt.
U.S. Appl. No. 14/202,780, filed Sep. 3, 2014, Schmidt.
Barresse, Microsoft Excel 2013—Flash Fill. Microsoft Excel and Access Experts Blog. Jul. 28, 2012. retrieved from https://excelandaccess.wordpress.com/2012/07/28/excel-2013-flash-fill/ [Mar. 3, 2016 1:45:25 PM].
A. Lorbert et al., Descent Methods for Tuning Parameter Refinement, Proceedings of the 13th International Conference on Artificial Intelligence and Statistics (AISTATS), 2010, pp. 469-476.
A. Rudi et al., Adaptive Optimization for Cross Validation, Proceedings of the European Symposium on Artificial Neural Networks, Computational Intelligence, and Machine Learning, 2012, pp. 435-440.
B. Boukhatem et al., Predicting concrete properties using neural networks (NN) with principal component analysis (PCA) technique, Computers and Concrete, vol. 10, No. 6, 2012, pp. 1-17.
B. Flyvbjerg et al., What Causes Cost Overruns in Transport Infrastructure Projects?, Transport Reviews, vol. 24, 2004, pp. 1-40.
B.K. Behera et al., Aabric Quality Evaluation by Objective Measurement, Indian Journal of Fibre and Textile Research, vol. 19, 1994, pp. 168-171.
C. Bordat et al., An Analysis of Cost Overruns and Time Delays of INDOT Projects, Final Report, FHWA/IN/JTRP-2004/7, Joint Transportation Research Program, Purdue University, 2004, 191 pages.
F. Xiao et al., Prediction of Fatigue Life of Rubberized Asphalt Concrete Mixtures Containing Reclaimed Asphalt Pavement Using Artificial Neural Networks, Journal of Materials in Civil Engineering, 2007, 41 pages.
G. Biau et al., COBRA: A Nonlinear Aggregation Strategy, Cornell University Library, Nov. 2013, 40 pages.
G. Bortolin et al., On modeling of curl in multi-ply paperboard, Journal of Process Control, vol. 16, 2006, pp. 419-429.
G. Bortolin, On Modeling and Estimation of Curl and Twist in Multi-ply Paperboard, Licentiate Thesis, Optimization and Systems Theory, Department of Mathematics, Royal Institute of Technology, Stockholm, Sweden, 2002, 106 pages.
Google Cloud Platform—Smart Autofill Spreadsheets Add on—Predication API. Apr. 23, 2015. retrieved from https://cloud.google.com/prediction/docs/smart_autofill_add_on. [Aug. 23, 2015], 9 pages.
I.M. Alsmadi et al., Evaluation of Cost Estimation Metrics: Towards a Unified Terminology, Journal of Computing and Information Technology, vol. 21, Mar. 2013, pp. 23-34.
International Preliminary Report on Patentability for International Application No. PCT/US2015/032203 dated Nov. 29, 2016. (9 pages).
International Search Report and Written Opinion in PCT/US2015/032203 dated Jul. 22, 2015, 11 pages.
International Search Report and Written Opinion in PCT/US2017/057753 dated Feb. 12, 2018, 14 pages.
K. Valkili et al., Finding Regression Outliers with FastRCS, Cornell University Library, Feb. 2014, 23 pages.
M. Claesen et al., Hyperparameter tuning in Python using Optunity, International Workshop on Technical Computing for Machine Learning and Mathematical Engineering (TCMM), Sep. 2014, 2 pages.
N. Deshpande et al., Modelling Compressive Strength of Recycled Aggregate Concrete by Artificial Neural Network, Model Tree and Non-linear Regression, International Journal of Sustainable Built Environment, Dec. 2014, pp. 187-198.
N. Deshpande et al., Modelling Compressive Strength of Recycled Aggregate Concrete Using Neural Networks and Regression, Concrete Research Letters, vol. 4(2), Jun. 2013, pp. 580-590.
N. Sharma et al., Incorporating Data Mining Techniques on Software Cost Estimation: Validation and Improvement, International Journal of Emerging Technology and Advanced Engineering, vol. 2, Mar. 2012, pp. 301-309.
P. Ramesh, Prediction of Cost Overruns Using Ensemble Methods in Data Mining and Text Mining Algorithms, Master's Thesis, Graduate Program in Civil and Environmental Engineering, Rutgers University, Jan. 2014, 50 pages.
P.J. Edwards et al., The application of neural networks to the paper-making industry, Proceedings of the European Symposium on Artificial Neural Networks, Apr. 1999, 6 pages.
R. Strapasson et al., Tensile and impact behavior of polypropylene/low density polyethylene blends, Polymer Testing 24, 2005, pp. 468-473.
S. Zheng, Boosting Based Conditional Quantile Estimation for Regression and Binary Classification, Proceedings of the 9th Mexican international conference on Artificial intelligence, 2010, pp. 67-79.

(56) References Cited

OTHER PUBLICATIONS

S.C. Lhee et al., Development of a two-step neural network-based model to predict construction cost contingency, Journal of Information Technology in Construction, vol. 19, Sep. 2014, pp. 399-411.

S.T. Yousif et al., Artificial Neural Network Model for Predicting Compressive Strength of Concrete, Tikrit Journal of Engineering Sciences, vol. 16, 2009, pp. 55-63.

V. Chandwani et al., Applications of Soft Computing in Civil Engineering: A Review, International Journal of Computer Applications, vol. 81, Nov. 2013, pp. 13-20.

V. Chandwani et al., Modeling Slump of Ready Mix Concrete Using Genetically Evolved Artificial Neural Networks, Advances in Artificial Neural Systems, Nov. 2014, 9 pages.

X. He et al., Practical Lessons from Predicting Clicks on Ads at Facebook, Proceedings of ADKDD'14, Aug. 2014, 9 pages.

Y. Shan et al., Machine Learning of Poorly Predictable Ecological Data, Ecological Modeling, vol. 195, 2006, pp. 129-138.

Y.X. Zhao et al., Concrete cracking process induced by steel corrosion—A review, Proceedings of the Thirteenth East Asia-Pacific Conference on Structural Engineering and Construction, Sep. 2013, pp. 1-10.

Z.A. Khalifelu et al., Comparison and evaluation of data mining techniques with algorithmic models in software cost estimation, Procedia Technology, vol. 1, 2012, pp. 65-71.

T. Kraska et al. MLbase: A distributed machine-learning system. In Proceedings of 6th Biennial Conference on Innovative Data Systems Research (CIDR'13), Jan. 6, 2013 (7 pages). Available at <http://cidrdb.org/cidr2013/Papers/CIDR13_Paper118.pdf>.

Ensemble Learning; https://en.wikipedia.org/wiki/Ensemble_learing; Creative Commons Attribution-ShareAlike License, Aug. 2, 2017; pp. 1-8.

Information Criterion; https://en.wikipedia.org/w/index.php?title=Informationcriterion&oldid=793390961; Creative Commons Attribution-ShareAlike License; Aug. 1, 2017; 1 pg.

\* cited by examiner

SYSTEMS AND METHODS FOR SYMBOLIC ANALYSIS

RELATED APPLICATIONS

This application claims priority under 35 U.S.C. § 119(e) to U.S. Provisional Application Ser. No. 61/695,660, "SYSTEMS AND METHODS FOR SYMBOLIC ANALYSIS BETWEEN DATA SETS," filed on Aug. 31, 2012, and U.S. Provisional Application Ser. No. 61/695,637 entitled "SYSTEMS AND METHODS FOR DATA SET SUBMISSION, SEARCHING AND RETRIEVAL," filed on Aug. 31, 2012, which applications are incorporated herein by reference in their entirety.

BACKGROUND

Symbolic regression is a promising technique for analyzing and identifying relationships within complex and/or expansive data sets. Typically, data sets being analyzed can include physically observable numerical data or data derivable from real world phenomenon. Complex systems yield correspondingly complex and expansive data sets. Symbolic regression provides one avenue on which to attempt to tackle analysis of such data sets. Symbolic regression can include a function discovery approach for analysis and modeling of numeric multivariate data sets. Insights about data and data generating systems can be determined by discovering a variety of symbolic expressions of functions that fit a given data set.

Symbolic regression, as opposed to classical regression techniques, enables discovery of both the form of the model and its parameters. Conventional implementations of symbolic regression systems proceed by asking a user to select a set of primitive functional operators allowed to generate mathematical models to evaluate data sets and then by applying learning algorithms to derive model structures and model parameters. However, even symbolic regression analysis can require a user to specify what expressions to look for. The need for a human user can be a severe bottleneck even in symbolic regression settings.

SUMMARY

Various problems result from conventional approaches for analyzing data both in conventional regression techniques and in some symbolic regression techniques. By exploiting automated approaches for symbolic analysis unique opportunities for discovering relationships between data sets can be achieved.

According to one aspect, symbolic regression ("SR") systems and methods can implement automated analysis of an input data set to establish data models for an input data set. According to one embodiment, the data set models can then be used by an SR system as a representation of the input data set. The representation of the data set can then be analyzed to determine relationships and/or similarity of the input representation to other representations of data sets. For example, the SR system can implement a user interface that accepts data sets as inputs, generates representations of the input data set, and delivers related and/or similar data models and data sets responsive to search requests.

According to another aspect, SR systems and methods can automatically analyze any data set to reduce the data set to a representative data model. In some embodiments, the data model can include a set of equations that best describe the data set. Each equation in the set can be viewed as a gene of the data model, and the set of equations the DNA sequence that encodes the represented system. According to one embodiment, the SR systems and methods can be configured to compare data models or the genome for one set of data against data models or genomes of other data sets to determine any relationship between the models, and hence relationships between the data sets represented. In some examples, the SR systems and methods compare each member of a set of equations against equations representing another data set to determine similarity scoring and/or relationships. In some embodiments, the SR system is configured not only to identify similarity and relationships but why the relationship exists between the data models.

Stated broadly, various aspects of the disclosure are directed to implementing symbolic regression systems and methods that automatically reduce data sets into representations of the data sets. The representations can be composed of fundamental building blocks or genes (i.e., the equations) discovered during automated symbolic regressions that describe the data sets. Through analysis of the sets of building blocks, relationships between data representations can be readily identified, even where the represented data is beyond traditional analysis (e.g., due to size, complexity, and/or inability of human operators to identify features on which to model the data). These relationships and/or similarity between data can be established for newly input data sets by searching for similar data sets and/or data models.

In some embodiments, similar and/or related data models can be returned as results presented in a user interface. Organization of the results in the user interface can include emphasis on the elements (e.g., equations, variables, etc.) that generated the similarity and/or relationship between analyzed models and/or underlying data sets. In some extensions of the broad concepts, submitters of new data can be identified and referred to other users associated with the related data to foster co-operative analysis, even in areas that previously had no recognized connections.

According to one aspect, a computer-implemented method of determining similarity between data sets is provided. The method comprises accessing, by a computer system, a first data model including a plurality of equations representing a data set of a plurality of variables and a plurality of values for each variable, and determining, by a computer system, similarity between the first data model and a plurality of comparison data models, and identifying, by the computer system, a result set of similar data models relative to the first data model.

In one embodiment, the method further comprises an act of generating, by the computer system, the first data model from a first data set of a plurality of values assigned to a plurality of variables. In one embodiment, the method further comprises an act of receiving over a communication network, from a user interface, the first data set. In one embodiment, the method further comprises acts of generating a field of equations to describe the first data set, evaluating the field of equations for accuracy and complexity, and recombining the field of equations randomly.

In one embodiment, the method further comprises an act of evaluating a normal form of at least one equation to determine a complexity value for the at least one equation. In one embodiment, the method further comprises an act of generating a normal form representation of at least one equation in a data model. In one embodiment, the method further comprises an act of generating an information score for the first data model and the plurality of comparison models.

In one embodiment, the method further comprises generating an information score for at least some of data models in the result set of similar data models. In one embodiment, generating the information score includes determining an accuracy of a respective model. In one embodiment, determining the accuracy of the respective model includes determining a squared error metric for the model. In one embodiment, determining the information score includes determining a complexity value for at least one expression in the respective model. In one embodiment, determining the complexity value for the at least one expression includes summing complexity values associated with operations in the at least one expression.

In one embodiment, the method further comprises an act of combining the sum of complexity values with a coefficient count of the at least one expression. In one embodiment, determining the information score includes determining an accuracy of a respective model discounted by the complexity value. In one embodiment, determining, by the computer system, similarity between the first data model and the plurality of comparison data models includes an act of analyzing, pair-wise, expressions in the first data model against expressions in a comparison data model. In one embodiment, the act of analyzing includes an act of enumerating each sub-expression from the first data model and the comparison data model.

In one embodiment, the act of analyzing includes an act of evaluating each sub-expression of the first data model against each sub-expression of the comparison data model to identify matching sub-expressions. In one embodiment, identifying matching sub-expressions includes an act of identifying similar operations in the evaluated sub-expressions. In one embodiment, determining, by the computer system, similarity between the first data model and the plurality of comparison data models includes an act of counting matching expressions in the first data model and a comparison data model.

In one embodiment, the method further comprises an act of dividing the number of matching expressions by the total number of possible matches. In one embodiment, the method further comprises an act of predicting behavior of the first data model based on behavior of similar data models.

According to one aspect, a system for determining similarity between data sets is provided. The system comprises, at least one processor operatively connect to a memory, the processor when executing implements an analysis engine, wherein the analysis engine is configured to access a first data model including a plurality of equations representing a data set of a plurality of variables and a plurality of values for each variable, determine similarity between the first data model and a plurality of comparison data models, and identify a result set of similar data models relative to the first data model.

In one embodiment, the analysis engine is further configured to generate the first data model from a first data set of a plurality of values assigned to a plurality of variables. In one embodiment, the analysis engine is further configured to receive over a communication network the first data set.

According to one embodiment, the analysis engine is further configured to generate a field of equations to describe the first data set, evaluate the field of equations for accuracy and complexity, and recombine the field of equations randomly. In one embodiment, the analysis engine is further configured to evaluate a normal form of at least one equation to determine a complexity value for the at least one equation.

In one embodiment, the analysis engine is further configured to generate a normal form representation of at least one equation in a data model.

In one embodiment, the analysis engine is further configured to generate an information score for the first data model and the plurality of comparison models. In one embodiment, the analysis engine is further configured to generate an information score for at least some of data models in the result set of similar data models. In one embodiment, the analysis engine is further configured to determine an accuracy of a respective model. In one embodiment, the analysis engine is further configured to determine a squared error metric for the model. In one embodiment, the analysis engine is further configured to determine a complexity value for at least one expression in the respective model.

In one embodiment, the analysis engine is further configured to sum complexity values associated with operations in the at least one expression. In one embodiment, the analysis engine is further configured to combine the sum of complexity values with a coefficient count of the at least one expression. In one embodiment, the analysis engine is further configured to determine an accuracy of a respective model discounted by the complexity value. In one embodiment, the analysis engine is further configured to analyze, pair-wise, expressions in the first data model against expressions in a comparison data model. In one embodiment, the analysis engine is further configured to enumerate each sub-expression from the first data model and the comparison data model.

In one embodiment, the analysis engine is further configured to evaluate each sub-expression of the first data model against each sub-expression of the comparison data model to identify matching sub-expressions. In one embodiment, the analysis engine is further configured to identify similar operations in the evaluated sub-expressions. In one embodiment, the analysis engine is further configured to ignore variable names for identifying the matching sub-expressions. In one embodiment, the analysis engine is further configured to count matching expressions in the first data model and a comparison data model. In one embodiment, the analysis engine is further configured to divide the number of matching expressions by the total number of possible matches. In one embodiment, the analysis engine is further configured to predict behavior of the first data model based on behavior of similar data models.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
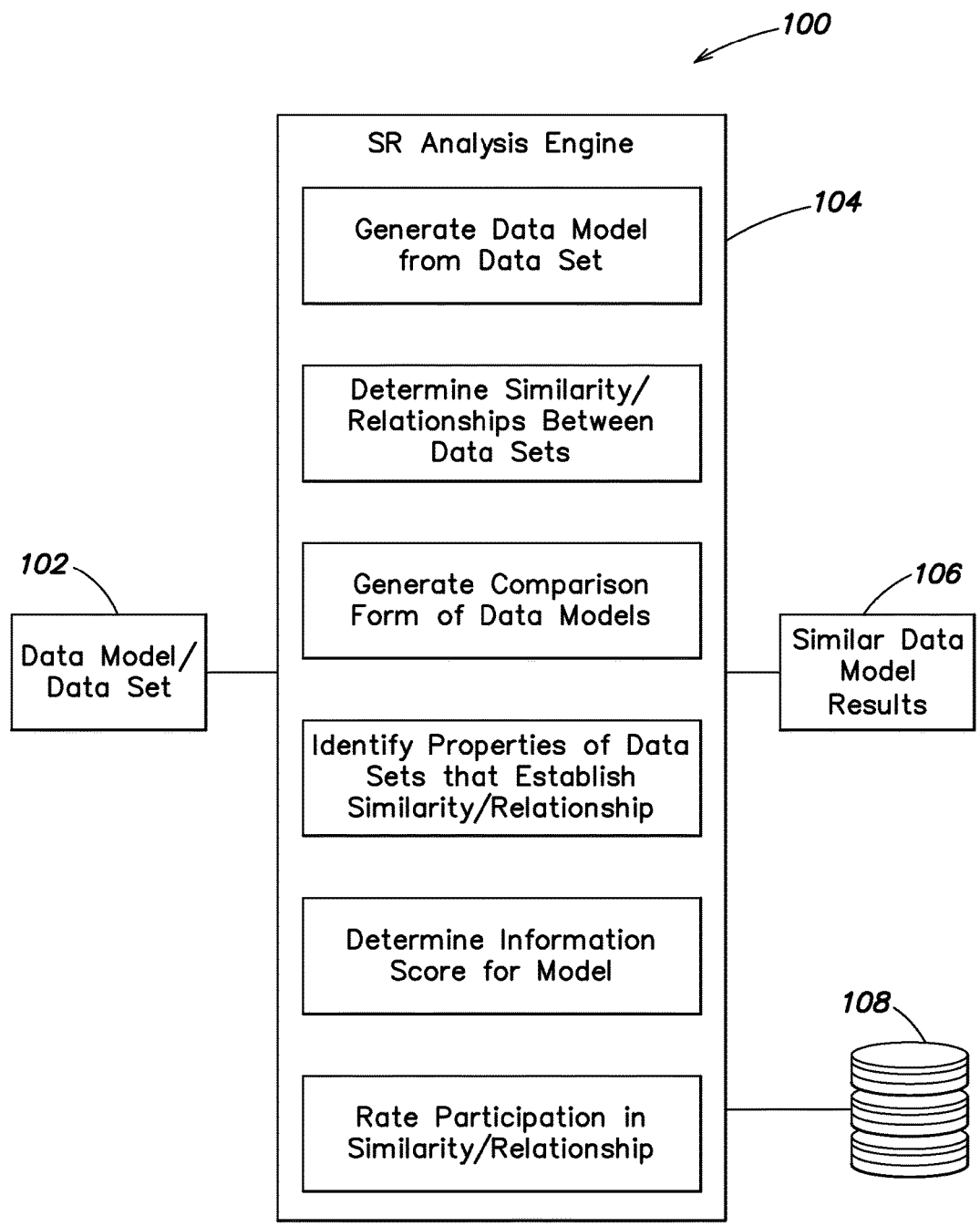
FIG. 1 is a diagram of an SR system for analyzing data sets using symbolic regression techniques, according to one embodiment.

As described above, determining symbolic relationships in existing datasets provides opportunities for analyzing data, identifying unique characteristics, and defining relationships in existing datasets. Further, various embodiments of SR systems and methods enable searching using data sets as a search input. According to one embodiment, an SR system enables searching on input data sets and finding symbolic relationships in data sets without requiring the user to have any knowledge of what to look for. In some embodiments, a SR system automatically executes symbolic regression processes to fit expressions to input data. A group of identified expressions that satisfy conditions for accuracy and simplicity can define a model for the input data.

In one example, an SR analysis engine can automatically execute co-evolutionary symbolic regression to define the data model for an input data set as part of an SR system. Co-evolutionary symbolic regression can include analysis of observed phenomenon, analysis of natural systems, analysis of simulated systems, and/or analysis of virtual systems based on the data sets collected for them. Various examples of natural, observable, simulated, and virtual systems can be recorded as a series of data values and associated variables. In one example, the motion of a pendulum can be observed and recorded as values for speed, orientation, position, acceleration, and mass, among other options. The values for those variables can be analyzed and reduced, by the SR system, to the set of equations that describe the recorded values and variables for the motion of the pendulum.

In one embodiment, the SR system is configured to perform co-evolutionary symbolic regression by generating and evaluating potential functions to fit to the data. According to one embodiment, the SR system attempts to fit a multiplicity of equations to the data to achieve equations having no improvements in either accuracy or simplicity. Typically, the SR system evaluates hundreds of thousands of equations falling into many mathematical model types (e.g., linear systems, non-linear systems, chaotic systems, random data, conserved systems, oscillating systems, linear oscillators, etc), if not millions of equations, to determine a function field of equations that fit the data.

According to one embodiment, initial basic equations can form an initial function field, wherein each of the basic functions (e.g., x+y, sin(x), sin(y), cos(variable), tan(variable), log(variable), $x^2$, $y^2$, $x^2+y^2$, $x^2+x^3$ . . . , etc.) is evaluated, by the SR system, for how well they fit the data. The function field can then be randomly re-combined to define new candidate functions in the function field. The function field can be evaluated again to identify functions that improve accuracy or improve simplicity yielding a better fit to the data.

According to some embodiments, the acts of randomly combining and evaluating can be repeated millions and even billions of times to generate a set of equations that provide a strong fit to the analyzed data. The evaluations and random re-combination of equations can be viewed as a survival of the fittest approach, where equations that do not improve either accuracy or simplicity are pruned from the field of equations used to model the data.

Figure 4:
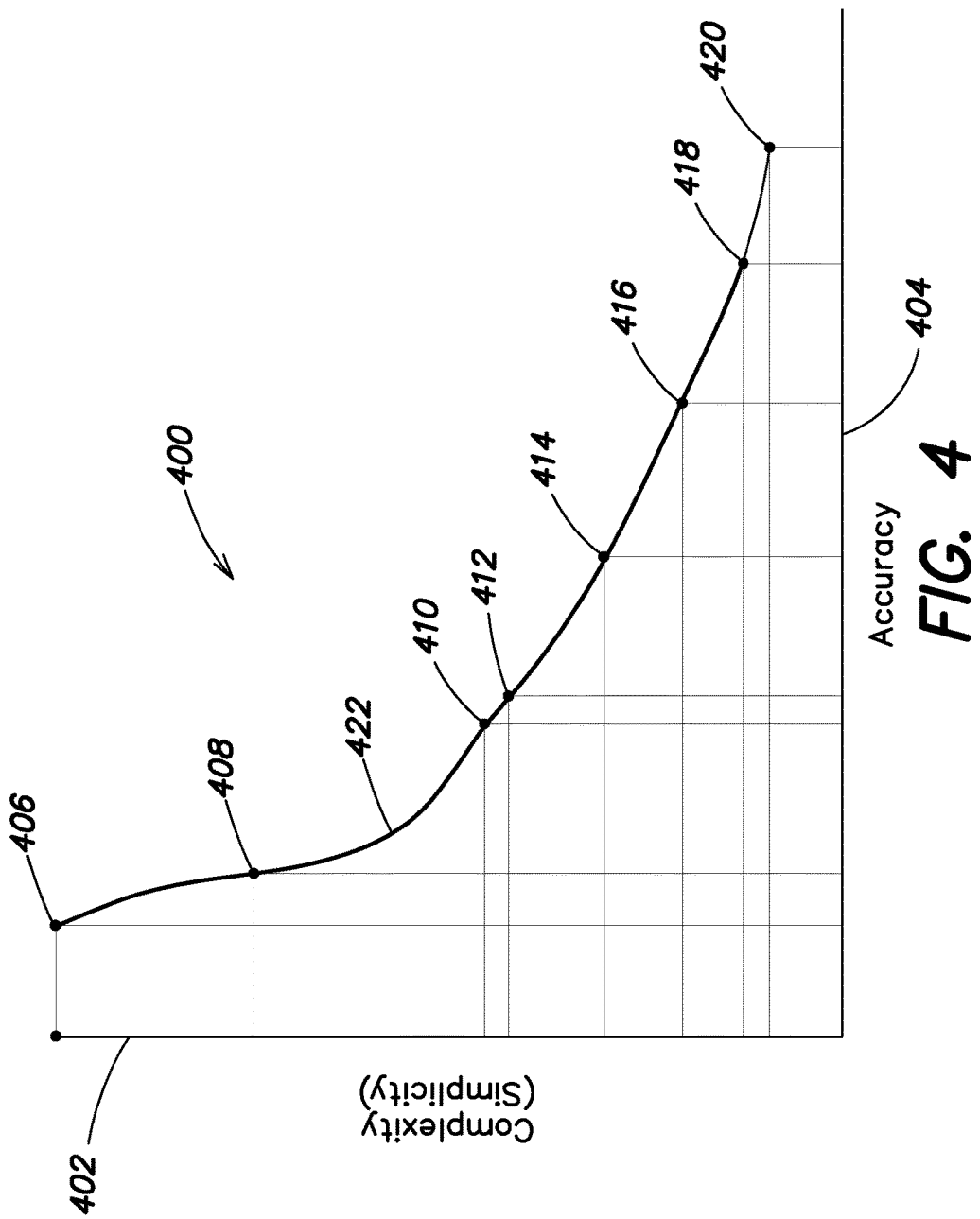
FIG. 4 is a graph of accuracy and complexity defining a Pareto Frontier, according to one embodiment.

The result is a set of equations that generates a front defined by equations having the best degrees of accuracy balanced against simplicity. The set of equations having no improvements on accuracy for a given level of complexity or no improvements on complexity for a given level of accuracy define a Pareto Frontier (an optimal boundary) on accuracy and complexity. (FIG. 4 illustrates an example Pareto Frontier graphically—discussed in greater detail below).

Once the SR system has established a data model, the SR system and/or SR analysis engine can parse other data models to identify similarity, relationships, and in some examples, the SR analysis engine can be further configured to identify why the data models or data sets are similar or have a relationship.

According to another aspect, comparison data models can be generated by an SR system automatically. In one embodiment, an SR system can be configured to crawl publically available data sources (e.g., from the Internet) or proprietary data sources. Once the SR system identifies a data set, the SR analysis engine can execute symbolic regression operations to define and store data models for subsequent comparisons, for example, in database 108, FIG. 1. Some SR systems can include an SR analysis engine that executes on one or more computer systems to provide the functions discussed herein. Further embodiments of SR systems can include SR engines discussed in co-pending U.S. application Ser. No. 14/016,287 entitled "SYSTEMS AND METHODS FOR DATA SET SUBMISSION, SEARCHING AND RETRIEVAL," filed on Sep. 3, 2013, which claims priority to U.S. Provisional Application Ser. No. 61/695,637 entitled "SYSTEMS AND METHODS FOR DATA SET SUBMISSION, SEARCHING AND RETRIEVAL," filed on Aug. 31, 2012, and U.S. Provisional Application Ser. No. 61/695,660, "SYSTEMS AND METHODS FOR SYMBOLIC ANALYSIS BETWEEN DATA SETS," filed on Aug. 31, 2012, which applications are incorporated by reference herein in their entirety. In still further embodiments, the features and functions described with respect to SR systems, SR engines, and/or SR analysis engines can be executed in embodiments of any one or more of the foregoing, individually, collectively, and in any combination.

Shown in FIG. 1 is an example system 100 that includes an SR analysis engine 104 for analyzing data sets (e.g., 102) using symbolic regression techniques. SR analysis engine 104 can be configured to generate information for display through an interactive portal including a search interface. According to one embodiment, elements of an SR system 100 can be provided using a computer system such as the computer system 900 described with reference to FIG. 9.

According to some embodiments, the SR analysis engine is configured to analyze a data set (e.g., 102) to generate a data model. Stated broadly, the SR analysis engine builds a description of the data set using a set of equations. The descriptive set of equations is the model of the data set. The equations within the model can be thought of as the genome of the data set being modeled, where the group of equations defines the DNA like sequence that can be used to generate (approximately) the data set. The SR analysis engine analyzes the generated data model to determine similarity to other data models. In some examples, the SR analysis engine 104 can instead be provided a data model (e.g., 102) directly from operations of other processes executed by an SR system.

According to some embodiments, data models can be evaluated by an SR analysis engine 104 based on accuracy and complexity to determine a best model. The scoring of each equation and/or model can be stored (e.g., in database 108) during model generation for later access and analysis. In some implementations, equations and their sub-expressions (e.g., equations within equations) can be modeled to facilitate analysis. For example, equations can be transformed into representations for evaluating complexity. In one embodiment, each equation is transformed into a binary parse tree representation of the equation.

In one example, a binary parse tree is a graphical construct having nodes and edges, with operators from the equation occupying root and internal nodes, with leaf nodes being the variables of the equations. Binary representation means each node can have up to two children. In one form of a complexity metric, the numbers of operations (e.g., root and internal nodes) and the number of variables (e.g., leaf nodes) are counted to generate a complexity value for an equation. Other complexity values can be calculated, discussed in greater detail below. Further, other representations of equations can be used, including, acyclic graphical representations, normalized forms of binary parse trees and/or acyclic representations (normalization can include, for example, sorting, ordering, precedence definition, de-duplication of sub-expressions, etc.), other parse trees, among other options.

Additionally, the representations generated for each equation can be stored (e.g., in database 108) for subsequent analysis and/or processing by the SR analysis engine 104. In some examples, representations of individual equations within data models can be stored to improve speed and efficiency of subsequent similarity analysis.

According to one aspect, an SR system and/or SR analysis engine can compare two data sets automatically to determine their similarity once the system/engine has access to respective lists of equations from their data models. According to one embodiment, given two data models (e.g., generated or stored data models 102) the SR analysis engine 104 is configured to enumerate over all pairs of sub-expressions from the expressions in each model to determine if two sub-expressions match. The SR analysis engine is configured to identify a match between two sub-expressions if the two sub-expressions contain similar operations. In one example, variable names within each sub-expression are ignore (i.e., (sin(x)) matches (sin(y))).

In one embodiment, the SR analysis engine counts the number of matches between models. The SR analysis engine can be configured to divide the total number of matches between two expressions by a number of total possible matches between the models to derive a universal similarity score. According to one embodiment, the SR analysis engine can store similarity scores for each comparison (e.g., in database 108). The SR analysis engine 104 can be further configured to evaluate the scores for any available data model to generate a set of the most similar data models (e.g., at 106).

According to some embodiments, the matched sub-expressions can be stored in association with similarity scores, providing insight into why and/or how two data sets are related. In one example, the SR analysis engine can be configured to store information on matched sub-expressions in database 108.

Additional information can also be stored during similarity analysis. In one embodiment, additional information stored can include an identification of a degree of participation a particular sub-expression had in a determination of similarity. For example, the SR analysis engine can also store how many times a specific sub-expression matched another expression in another model for each matched sub-expression. The degree of participation in the similarity score determined can provide additional insight, for example, during delivery of a set of similar data model results from 106.

In one embodiment, a plurality of data models and associated similarity analysis can be stored on the SR system, for example, on database 108, which can be used for data model comparisons and generating result sets of similar data models. In other embodiments, existing data models and similarity analysis can be stored in network accessible locations, including, for example, cloud storage, SANs, or databases located on connected computer systems. The SR analysis engine can be configured to retrieve and/or access stored data models and similarity analysis from such storage locations to generate result sets of similar data models.

In other embodiments, other matching techniques can be used to determine similarity between models. For example, the SR analysis engine can be configured to execute co-compression analysis between two data models. In another embodiment, the SR analysis engine can be configured to generate data from a first data model being compared and fit the generated data to the second data model being compared for similarity. The result is a similarity score that indicates how well the data generated from the $1^{st}$ model is able to be fit the $2^{nd}$ data model. Other embodiments of an SR analysis engine implement other similarity scorings, and further can use one or more approaches for determining similarity to generate a set of similar data models at 106.

Figure 2:
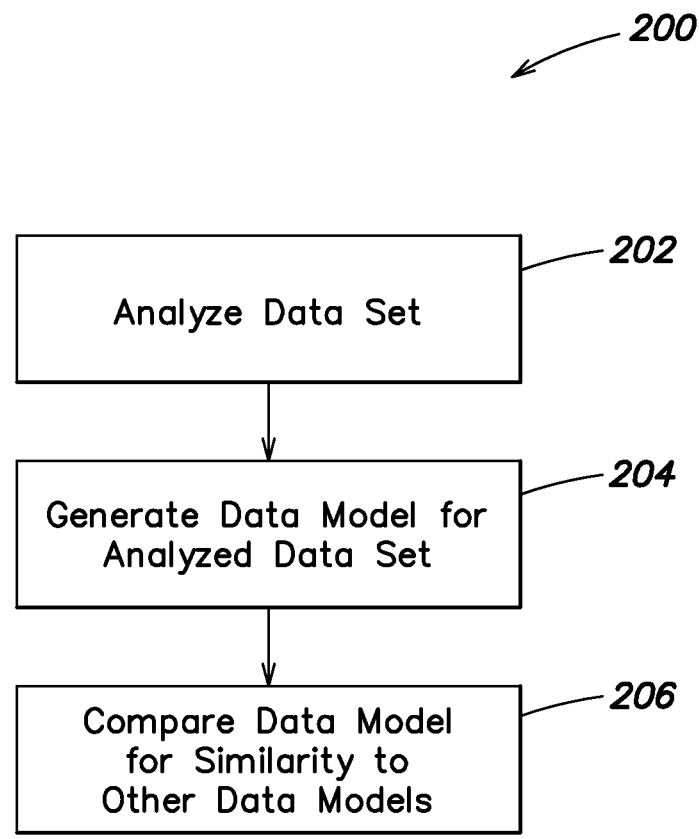
FIG. 2 is an example process flow for evaluating a data set and determining similar data models, according to one embodiment.

As described above, the SR analysis engine can be used to evaluate and score data models for similarity to other data models. FIG. 2 shows one example of a process 200 for evaluating a data set and determining similar data models. According to one embodiment, determining similar data models can include steps of detecting and processing mathematical expressions, sub-expressions, and/or representations of both, using the computer systems described below with reference to FIG. 9. In other embodiments, process 200 can be executed by an SR system and/or SR analysis engine.

Process 200 includes a step of analyzing the data set at 202. Various data sets can be analyzed at 202. For example, analyzed data sets can include variables and values recording observed phenomenon, natural systems, simulated systems, and/or virtual systems. Various examples of natural, observable, simulated, and virtual systems can be recorded a series of data values and associated variables. Each such data set can be analyzed in 202, and a model including a set of equations that describe the data can be generated. In one example, the motion of a pendulum can be observed and recorded as values for speed, orientation, position, acceleration, and mass, among other options. The values for those variables can be analyzed and reduced, by the SR system, to the set of equations that describe the recorded values and variables for the motion of the pendulum (e.g., at 204).

Generating a data model at 204 for the analyzed data set can include co-evolutionary symbolic regression to define a Pareto Frontier of a set of equations having the best accuracy and simplicity for describing a data set. In some embodiments, definition of a data model at 204 can include execution of sub-processes (e.g., FIG. 3, process 300) to establish a given data model. According to some embodiments, the Pareto Frontier defines a subset of equations that satisfy either condition: no other equation has better accuracy for a given level of complexity; or no other equation has better complexity for a given level of accuracy. FIG. 4 illustrates one embodiment of an example graph showing complexity and accuracy 400 for a set of equations being evaluated. The vertical axis 402 shows a degree of complexity, with the larger values indicating a simpler equation. The horizontal axis 404 shows the degree of accuracy or ability to fit the models data. The data points 406-420 show equations having different levels of accuracy and complexity as plotted points on the graph. Under the area of line 422 reside the equations (not shown) within an analyzed field of equations that have lesser values for complexity and accuracy.

According to some embodiments, once a data model is defined at 204, process 200 continues at 206 by comparing the defined model to other data models to determine their similarity. In some embodiments process 200 can call other sub-processes during execution as part of and/or in conjunction with the recited steps of process 200. For example, at 206 process 200 can invoke a sub-process for calculating similarity between models (including, for example, process 600, FIG. 6). At 206, process 200 can evaluate each expression in a first data model against each expression in a second data model to determine a similarity score between the models. In some embodiments, each equation is analyzed to identify any sub-expressions, and each sub-expression is evaluated for matches to any sub-expression in the $2^{nd}$ data model set of equations.

Figure 8:
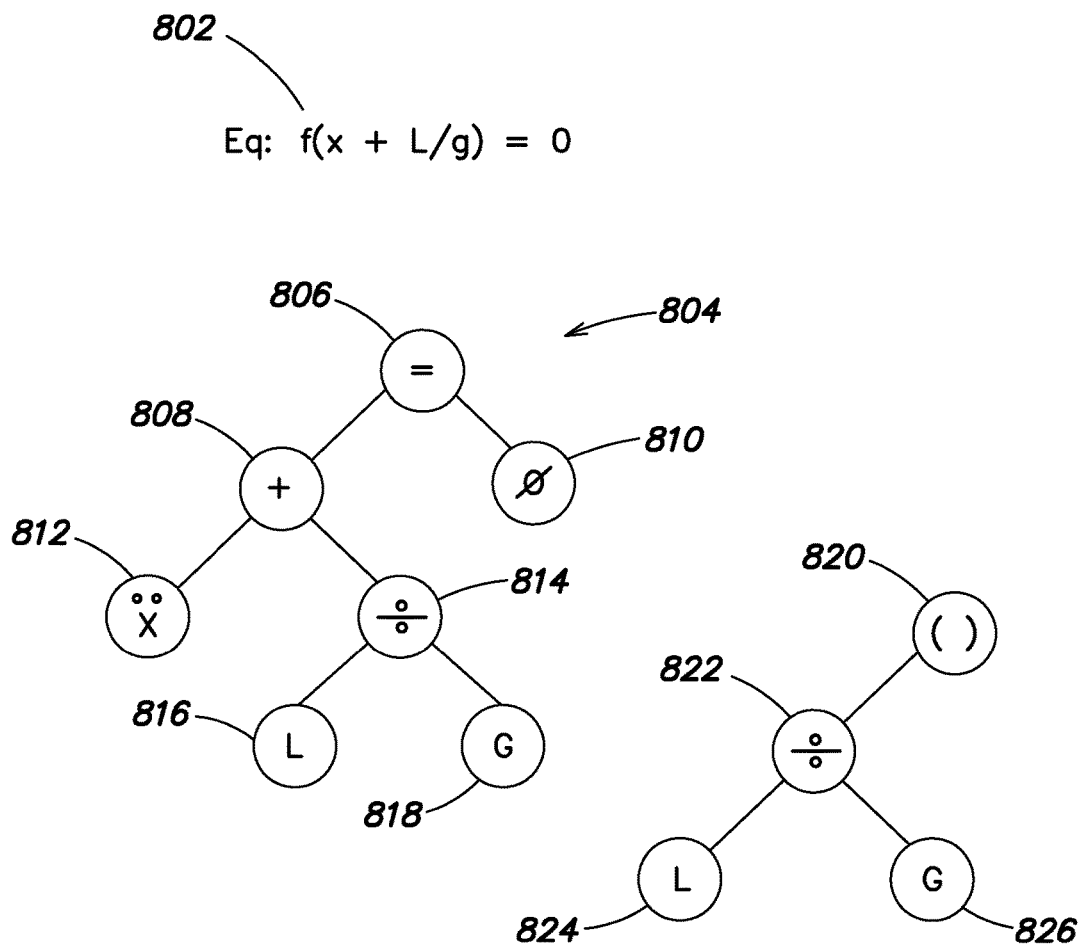
FIG. 8 is an example parse tree for an equation, according to one embodiment.

During identification of sub-expressions, each equation may be transformed into a comparison representation. For example, an equation or expression can be transformed into its associated binary parse tree form by generating root and internal nodes from operators in the expression and leaf nodes from variables in the expression. FIG. 8 illustrates one embodiment of an example expression 802 and binary parse tree form of the expression 804. In some embodiments, model generation can include generation of representations of expressions within the model, and the stored representations can be evaluated at 206.

When matching sub-expressions are identified, the number of matches is counted and divided by the total number of possible matches to generate a similarity score between two data models. Sub-expressions match if they contain similar operations. In some embodiments, specific variable names and coefficients can be ignored in identifying matches. For example, "sin(3.1*x)" matches "sin(-20*y)". However, no match results where additional or new operators are identified: for example, there is no match between "sin(3.1*x)" and "sin(3.3*x^2)". The exponentiation of x results in no match being determined.

At 206, similarity scores identified between available data models are evaluated to identify data models having the highest degree of similarity to the data set being analyzed at 202. In some embodiments, all the evaluated data models and their relative similarity can be delivered during execution of process 200. In other embodiments, the evaluated data models can be filtered based on the level of similarity identified. Rather than execute the entirety of process 200, in some embodiments, a data model can be provided by other processes and determination of similarity can proceed with execution of steps from process 200, e.g., 206. In other embodiments other processes can be executed to determine similarity, and may invoke other sub-processes to supplement, augment, and/or replace steps in process 200.

Figure 3:
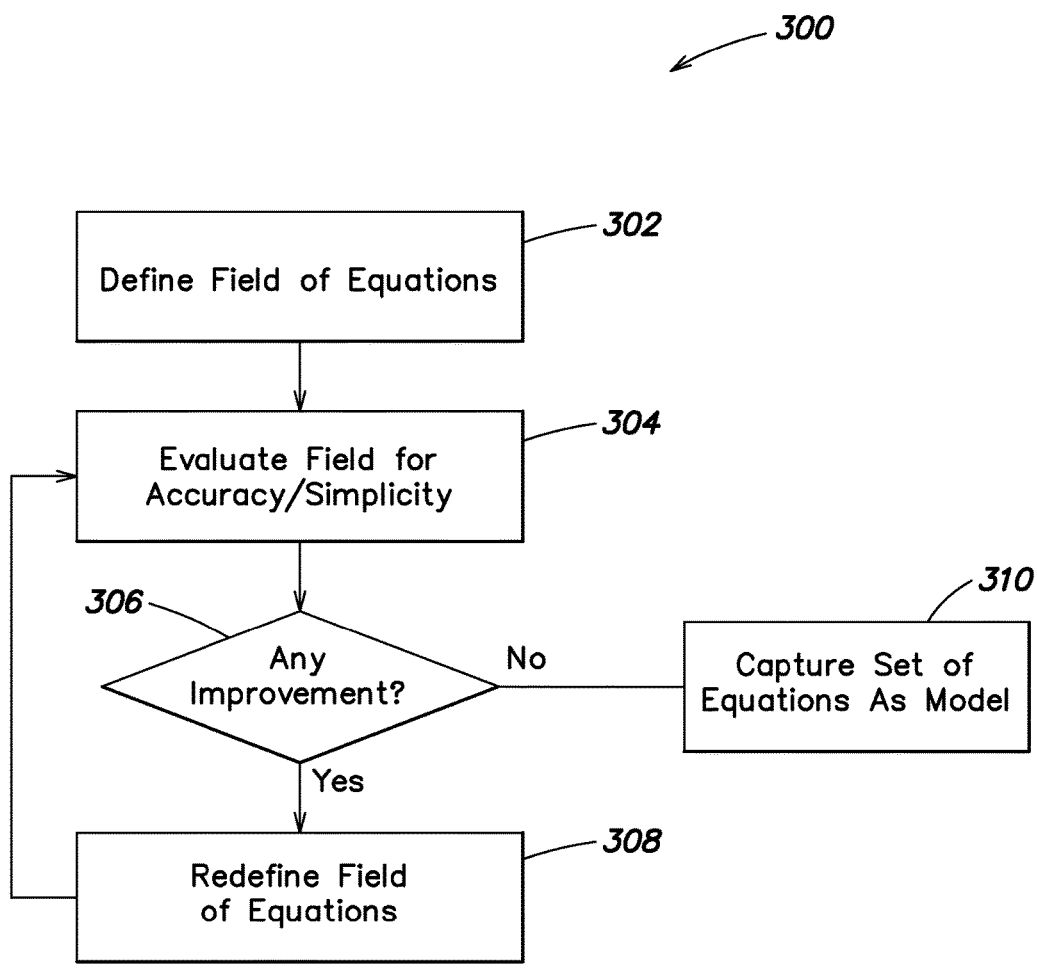
FIG. 3 is an example process flow for generating a data model for a data set, according to one embodiment.

As discussed, process 200, can invoke other sub-processes during execution. Shown in FIG. 3, is one example sub-process 300 for generating a data model for a data set. In some embodiments, sub-process 300 can be executed as part of a larger process, can be called by a step in another process (e.g., at 204 of FIG. 2), in other embodiments, sub-process 300 can be executed alone.

Process 300 begins at 302 with defining a field of equations to fit to a data set. According to one embodiment, the field of equations can be set initially at 302 using known basic equations which form an initial function field. Each of the basic functions (e.g., x+y, sin(x), sin(y), cos(variable), tan(variable), log(variable), x^2, y^2, x^2+y^2, x^2+x^3 . . . , etc.) can be evaluated at 304 for how well they fit the data, including determinations of accuracy and simplicity of the evaluated equations. As no current model exists, the initial evaluations result in improvement in the accuracy and simplicity of the model at 306 YES. At 308, the function field can then be randomly re-combined to get new candidate functions in the function field for further evaluation at 304. If any improvement in accuracy or simplicity is identified 306, the improvements are used to redefine the function field by further random re-combinations at 308. The new field of equations can be evaluated hundreds of thousands of times, if not millions, until no further improvements in accuracy or simplicity are identified at 306 NO.

Once no further improvements in accuracy or simplicity have been identified from the field of equations at 306, the set of equations can be captured at 310. The captured set of equations is the model that describes the analyzed data.

Various metrics can be used during execution of process 300 for determining accuracy and/or complexity, for example, during evaluation at 304. One embodiment, implements a standard metric for complexity, which includes using a binary parse tree representation of an equation and defining complexity as a number of nodes (e.g., number of operations and leaves) in the parse tree. In another embodiment, different complexity metrics can be implemented.

Figure 5:
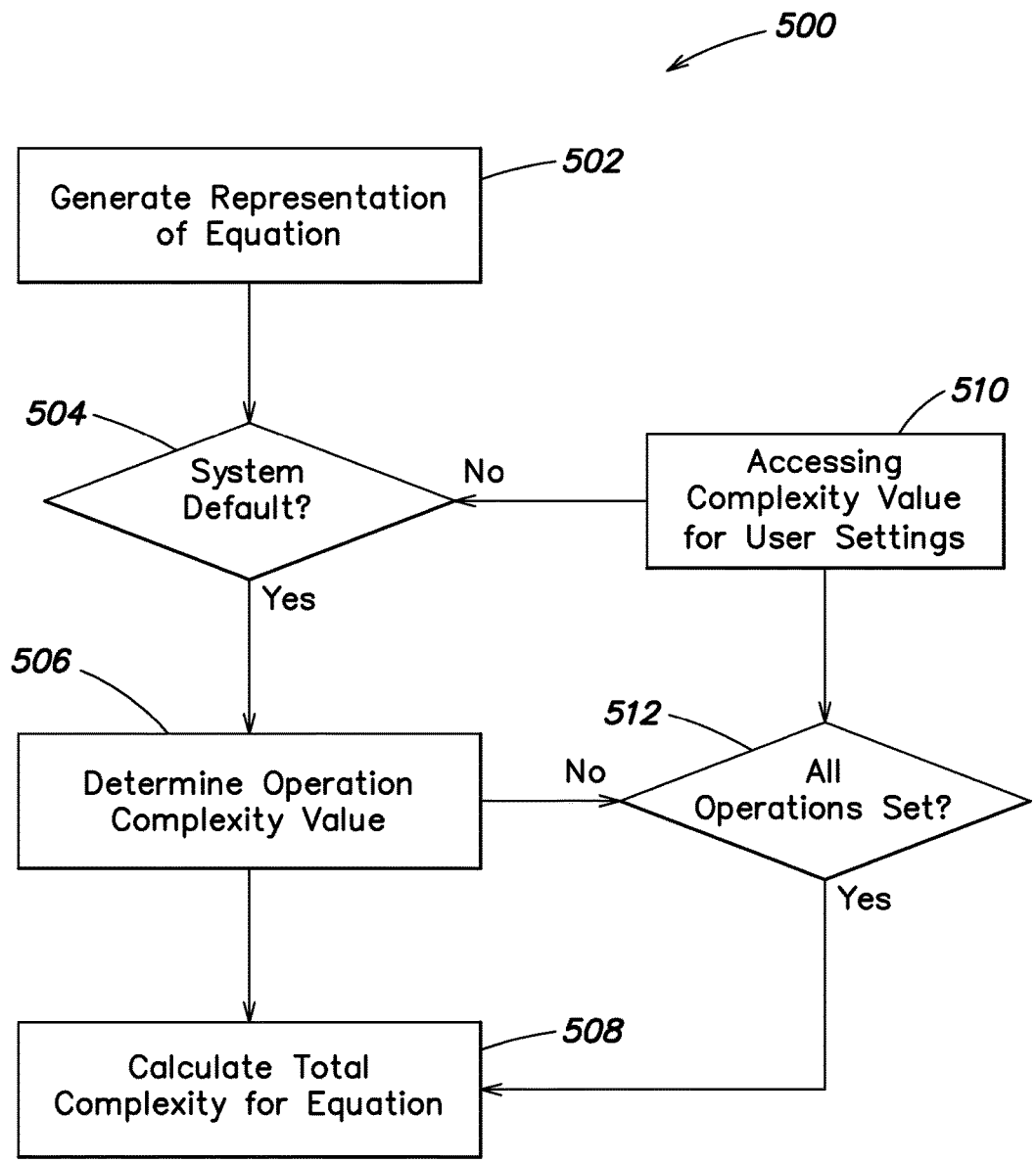
FIG. 5 is an example process flow for determining complexity of a data model, according to one embodiment

Shown in FIG. 5, is one embodiment of an example process for determining complexity of an expression. In some embodiments, process 500 can be executed by other processes (e.g., process 300 at 304). In other embodiments, process 500 can be executed alone and the results stored for access by other operations, systems, and/or system components of an SR system.

Process 500 begins at 502 by generating a representation of an equation. As discussed, equations can be transformed into, for example, a binary parse tree representation and the representation can be used to establish a degree of complexity. According to some embodiments, step 502 includes generation of a binary parse tree representation of an equation being analyzed. In further embodiments, the binary parse tree representation can be constructed in a normal form to assist in comparing equation structures between equations.

Shown in FIG. 8 is an example equation 802 "f(x+L/g)= 0" for describing the motion of a pendulum in terms of gravity and length of the pendulum, where x represents change in angular displacement over change in time squared. The binary parse tree representation of 802 is illustrated at 804, where the operations contained in the equation 802 are used to construct the tree based on their order of precedence. According to one embodiment, operations having the lowest precedence are used to build the upper portions of the tree. At 806 "=" defines the lowest precedence operation (i.e., the operator executed last), with the next lowest precedence operator at 808. Leaf nodes (variables and constants) are constructed off of an operator parent node (e.g., 810 "0" and 812 "x"). The binary parse tree can include sub-expressions (i.e., equations within equations), which are assigned to the tree based on their order of precedence. Operator "/" is assigned at 814, with its respective variables being assigned to leaf nodes 816 "L" and 818 "G". Alternatively, sub-expression "L/G" can include a sub-expression identifier in the tree "( )" with the operator "/" 822 appearing as a child of the sub-expression identifier 820. The respective variables are assigned to leaf nodes 824 "L" and 826 "G" as before. The normal form of the binary parse tree can include simplification of terms in an expression (e.g., "x*x/x" simplifies to "x", etc), sorting of terms in an expression, de-duplication of sub-expression, etc. Further, other representations and/or sub-expressions can be generated during execution of process 500. For example, at 502, an acyclic graphical representation of an equation can be generated. The acyclic graph can be normalized as above to facilitate more accurate determinations of complexity.

Once an equation is transformed into a normalized representation at 502, process 500 can continue with a determination of whether default values for complexity should be used at 504. In some embodiments, complexity values are configurable by a user, system administration, etc. Process 500 can include steps to determine whether default values, which can be automatically calculated, should be assigned to the elements of the representation generated at 502. If system default complexity is being used 504 YES, then process 500 continues with determining an equation complexity values at 506 from the complexity values of its operations.

For example, specific complexity values for each operation type can be assigned. In one instance, an add operation has a value of 1, while a multiply operation has a value of 2, exponentiation has another complexity value assigned, etc. In some embodiments, the complexity values for each operation type are defined relative to the operations of addition and multiplication, as the equivalent complexity of the first two terms in the series expansions of that function, assuming fixed values for add and multiply. In one example, $\cos(x)$ has a series expansion of $1+-1*x*x+\ldots$. Using fixed values of add and multiply of 1, the series expansion has the complexity of 3 since there is 1 addition and 2 multiplications in the first 2 terms. Once each operation has been assigned a complexity value, the sum of all the complexities can be calculated to derive the complexity metric for a given equation at 508.

In some embodiments, the complexity of the first few terms in a respective series expression can be used to establish a complexity value for each associated operation. As discussed, in some implementations, some operations being evaluated can also be assigned fixed complexity values (e.g., add can be set to 1, and multiply can be set to 2 regardless of the series expansion the operations with constant values appear in). The system can then be configured to assign specific complexity values for each operation type—for example, an add operation is 1, while a $\cos(x)$ operation is 3, exponentiation is assigned another complexity value, etc.

By default, the values for each operation type are defined relative to the operations of addition and multiplication, as the equivalent complexity of the first two terms in the series expansions of that function, assuming fixed values for add and multiply. In the example, $\cos(x)$ has a series expansion of $1+-1*x*x+\ldots$. Using fixed values of add and multiply of 1, the series expansion has the complexity of 3 since there is 1 addition and 2 multiplications in the first 2 terms. Once each operation has been assigned a complexity value, the sum of all the complexities is calculated to derive the new complexity metric for a given equation.

Returning to 506, the default assignment of a complexity value can include analysis of the series expansion associated with a particular operation. Series expansions are known mathematical operations by which a function can be expressed as series of polynomials (including, e.g., an infinite series of polynomials (which can include Taylor and MacLaurin series, among other options)). As discussed, the values assigned automatically can be, for example, based on the first few terms of the series expansions for an analyzed operation and/or equation.

In some embodiments, complexity values can also be user configurable as to the complexity value assigned to each operation within an equation. For example, if it is determined that user assigned complexity values should be used (e.g., 504 NO) execution of process 500 can include step 510 with accessing assigned complexity values from, for example, assigned user settings. If user settings have been assigned, 504 NO, the assigned values are accessed at 510. At 512, process 500 can determine whether all the necessary complexity values for the equation have been assigned. If they have, 512 YES, the total complexity for the equation can be calculated at 508 from the constituent complexity values. If all the operations have not been assigned 512 NO then process 500 proceeds to 506 where the complexity values for the remaining operations are determined. According to some embodiments, at 508, the total complexity for the equation can be determined from a mix of assigned and determined complexity values.

In some embodiments, data models and/or the equations within the data model are evaluated on accuracy and complexity to determine an information score for the equations and/or data model. Complexity evaluations made during, for example, of process 500 can be stored for subsequent analysis of data models. In other embodiments, process 500 can be executed in conjunction with other processes for determining an information score of a particular data model. For example, an SR analysis engine can be configured to automatically generate information scores for data models and/or equations within data models during similarity analysis.

In some embodiments, determination of accuracy and complexity can be influenced by system configurable options. Criteria input into the system can specify user preference towards data models/equations that are more accurate, less complex, and/or better balanced between accuracy and complexity (in one example, shifting the frontier used to identify/define the best equations for the model). By enabling modification of the scoring of a data model, the system can be configurable to tailor a generated result set of similar data models and the identification of what or why they are similar.

As discussed above, given a data model various embodiments of an SR system can be configured to compare other data models for similarities and/or relationships. In some embodiments, equations within models can be compared to equations in the other data models to determine similarity. In further embodiments, the compared equations can be transformed into comparable representation of each equations during similarity analysis and/or during model generation (e.g., equations can be transformed into binary parse tree representations). In some further embodiments, the presence of variables within those representations can be used during the similarity analysis, while the specific value associated with each variable can be ignored. For example, the presence of leaf nodes in FIG. 8 can be used in similarity analysis and the actual value (e.g., "L" of leaf node 816) for that node can be ignored.

Figure 6:
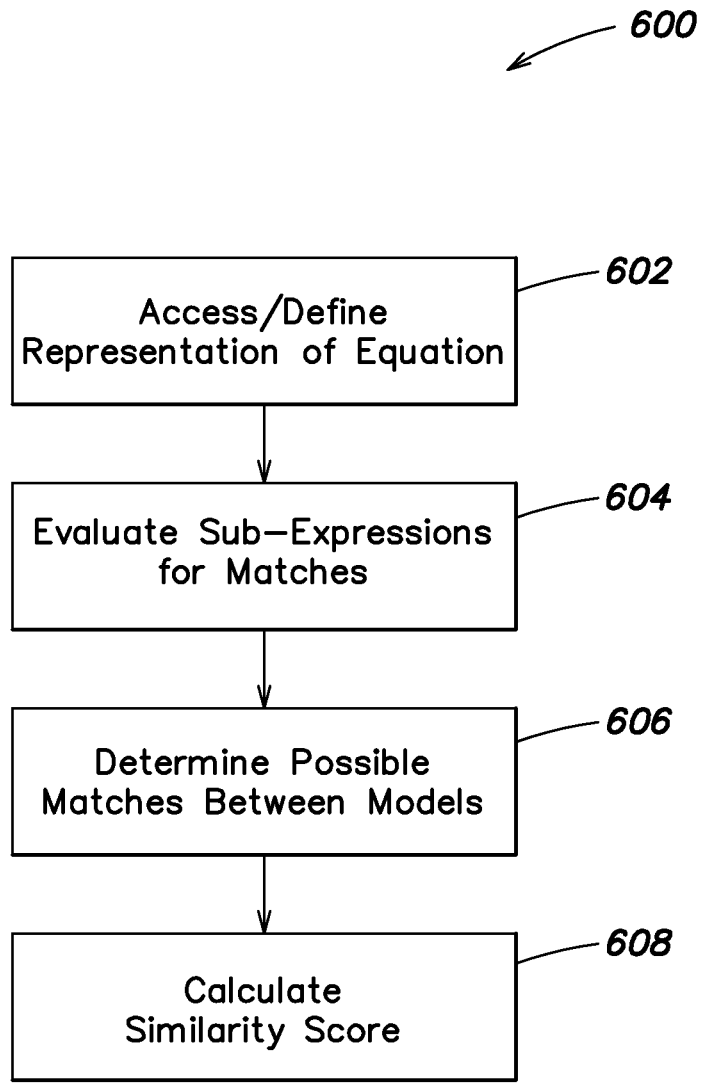
FIG. 6 is an example process flow for determining similarity between expressions in data models, according to one embodiment.

Shown in FIG. 6, is one example process 600 for determining similarity between expressions in data models. In some embodiments, process 600 can be executed as part of a larger process (e.g., process 200 at 206), in others, process 600 can be executed alone, and, for example, the results can be accessed by other processes and/or system component from a system memory.

According to one embodiment, process 600 begins at 602 by defining a representation of an equation from a data model. Process 600 can also begin by accessing an already generated representation of the equation, which can be determined, for example, during model generation (e.g., process 500, FIG. 5). According to one aspect, binary parse tree representations of equations within models can be analyzed to determine if another model has similar equations and/or properties. In some embodiments, acyclic graphical representations can be generated and analyzed for each equation.

Process 600 continues at 604, where each equation and/or any sub-expressions within each equation within a model are compared in a pair-wise fashion to other equations and any respective sub-expressions in a plurality of other data models. The comparison can be used to generate similarity scorings for the expressions (e.g., based on a distance between the compared equations). In further embodiments, each sub-expression is enumerated and evaluated against all the expressions and sub-expressions in a first comparison data model. Each sub-expression can be enumerated and evaluated against all the expressions and sub-expressions in a second comparison data model, and so on until a set of comparison data models is exhausted.

In some embodiments, other processes can be executed to identify a set of comparison models. For example, a set of available data models can be filtered using a course similarity evaluation, and models that do not pass the course filter can be eliminated from a set of comparison models. Process 700 (discussed in greater detail below) includes an example embodiment of a process for determining a course similarity between data models.

Returning to process 600, in one example, step 604 can include a breadth first expansion of a first equation in a first data model and a first comparison equation in a first comparison data model. The breadth first expansion includes identifying and enumerating all the sub-expressions in the first equation, which are then compared against all the sub-expressions enumerated from a breadth first expansion of the first comparison equation. The enumerated sub-expressions from the first equation are then compared against a second comparison equation and any sub-expressions. In one embodiment, the evaluation of the sub-expressions from the first equation is repeated for every equation and their respective sub-expressions in the comparison data model. Any other equations in the first data model can likewise be evaluated to identify any sub-expressions, and each respective sub-expression can be compared to every equation and their respective sub-expressions in the comparison data model.

In some embodiments, all the equations and sub-expressions can be enumerated then compared to the enumeration of all the equations and sub-expressions in a comparison data model, for example, at 604. Step 604 can include the iterative comparison of all the equations and sub-expressions for a first data model against all the enumeration of all the equations and sub-expressions for each one of a plurality of comparison data models. In other embodiments, step 604 can be repeated for each comparison data model available, until a set of comparison models has been evaluated.

According to some embodiments, the analysis of equations and sub-expressions can be used to generate similarity scorings between each equation and/or sub-expression, and further can be used to identify what and/or why two expressions are similar. In some examples, the specific equations and/or sub-expressions that participate in a similarity scoring can be stored in association with a generated similarity score. In some embodiments, the similarity score can be based on a determination of distance between two equations and/or sub-expressions. Some distance calculations between various equations that can be executed include determination of Euclidean distance, Manhattan distance, Kullback-Leibler distance, Hellinger distance, cosine difference, Jaccard distance, diversity difference, Jenson-Shannon divergence, and skew divergence, among other options.

In another embodiment, process 600 can determine matches between equations and/or sub-expressions at 604. Matches between two sub-expressions are identified if the two sub-expressions contain similar operations. In one example, variable names within each sub-expression are not considered (i.e., (sin(x)) matches (sin(y)) and (constant*(x)–constant*(y) matches constant*(z)–constant*(w)). In another example, "sin(3.1*x)" matches "sin(–20*y)". However, no match results where additional or new operators are identified: no match between "sin(3.1*x)" and "sin(3.3*x^2)". The exponentiation of x results in no match being determined.

In one embodiment, the number of matches between enumerated equations and sub-expressions of compared data models are counted for each match. The enumeration of the equations and sub-expressions establishes the number of potential matches that could result between two data models (e.g., at 606). According to one embodiment, a comparable similarity score can be generated by dividing a total number of matches by the total number of possible matches between two models, for example, at 608. Similarity scores generated between a first data model and a plurality of data models can be compared to establish groups of similar data models.

In some embodiments, similar data models can be grouped based on type of data model. In further embodiments, similarity scores can be associated with specific equations, and in some examples specific variables. Groups of data models can be generated based on equation, equation type, and/or common variables. In some embodiments, within each group, data models can be organized based on respective similarity scores.

In addition to counted matches identified at 604, each matching equation can be associated with its total number of matches for each similarity score determined. According to some embodiments, tracking each matching equation's participation in the generated similarity score can provide further insights into how and/or why data models are related.

As discussed above, course similarity can be calculated in conjunction with other similarity analyses. A course similarity determination can be made to reduce the number of data models that need to be analyzed on each equation and/or sub-expression identified within each equation.

Figure 7:
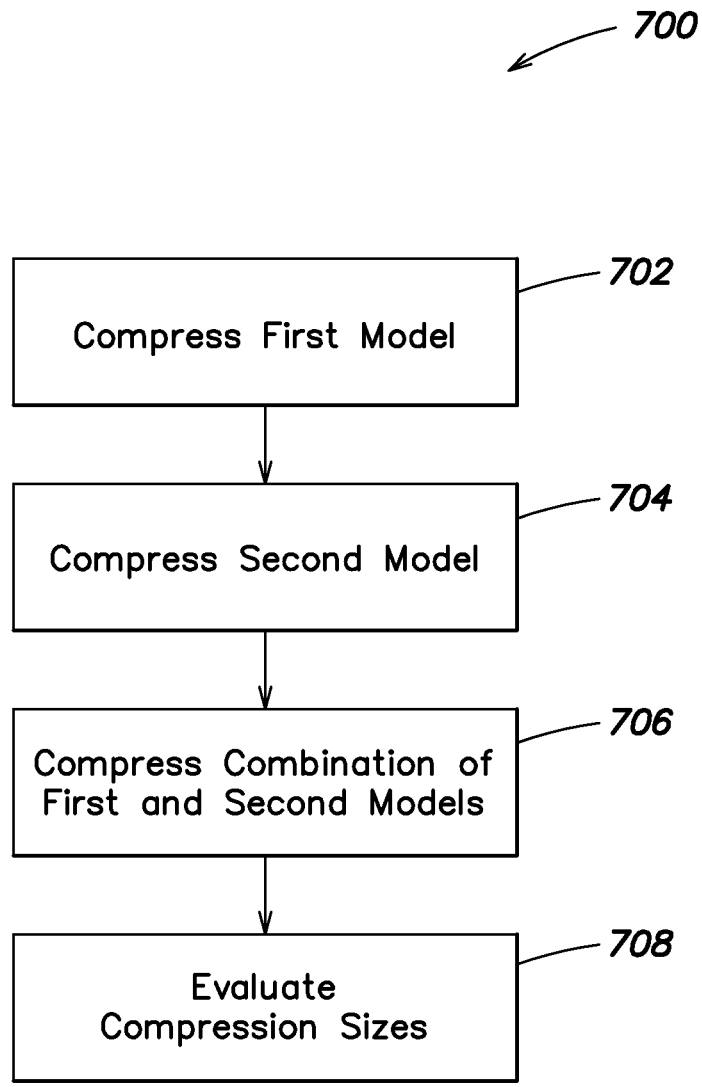
FIG. 7 is an example process flow determining course similarity between two data models, according to one embodiment.

Shown in FIG. 7 is an embodiment of an example process 700 for determining course similarity between two data models. In some embodiments, process 700 can be used to identify comparison data models for a given data set. The comparison data models can be evaluated more rigorously, for example, using process 600 by comparing each model equation by equation and sub-expression by sub-expression. Rigorous similarity analysis can be configured to identify similarity between data models or data sets and why or how two data models/sets are similar. Course similarity can include computations that are less burdensome that rigorous analysis, for example, by determining a similarity scoring alone, without requiring determination of how or why data models are similar.

Process 700 begins at 702 with compressing data associated with a first data model. The data associated with the first data model can, in some examples, be generated during step 702 and then the generated data can be compressed using known compression algorithms. In other embodiments, an underlying data set can be accessed and compressed to determine a degree of compression for a first data set associated with the first data model. At 704, a comparison model is compressed using known compressions algorithms (e.g., the compression itself may not be important, but same compression approach can be used during individual executions of process 700).

In some embodiments, the comparison data model can be used to generate a comparison set of data from the model. The comparison set of data can be used as an input to the compression algorithm. In some examples, data sets generated for the first data model and the comparison data model can be generated to have the same size prior to input into the compression algorithm (e.g., file size, data set size, number of rows in a table of values, etc.). In other embodiments, an underlying data set for the comparison data model can be accessed and used an input into a compression algorithm at 704.

At 706, each of the sets of data for the first and comparison data sets are again compressed, this time, using both sets as input into the compression algorithm. In one example, the two data sets are concatenated and then compressed. At 708, the respective sizes of each compression are evaluated to determine if the data models are similar. According to some embodiments, the two data models are similar if the size of the compression of the first data set plus the size of the compression of the comparison data set is greater than the size of compression of the two data sets together. Alternatively, two data models are not similar if the size of the compression of the two data sets is greater than the size of the compression of the first data set plus the size of the compression of the comparison data set. Data models that are determined to not be similar can be filtered out of subsequent similarity analysis (e.g., during an execution of process 600). In some embodiments, a plurality of data models can be evaluated against a first data model to define a comparison set of data models. In further embodiments, compression sizes for each data model/set can be stored and used during a co-compression evaluation, rather than requiring generation of a data set and/or access to an underlying data set.

According to various embodiments, other similarity comparisons can also be used in conjunction with, and/or instead of, co-compression (e.g., process 700) or expression enumeration and pair-wise matching (similar to process 600). For example, a first data model can be used to generate a first data set. The generated data can then be fit to a comparison data model and its respective set of equations. Depending on how well the generated data can be fit to the comparison model, an SR system can determine a degree of similarity between the first data model and the comparison data model. In some embodiments, the information obtained during "fitting" can include why the two data models are similar. In some examples, the fitting approach for similarity can identify why or how two models are similar, however, the fitting approach can be less accurate than an enumeration and matching approach for determining why two data models are similar.

According to another aspect, once a result set of similar data models have been identified, each data model from the result set can be rated on its respective information content. In some embodiments, data models and/or the equations within the data model are evaluated on accuracy and complexity to determine an information score for the equations and/or data model. For example, an SR system and/or SR analysis engine can be configured to automatically generate information scores for data models and/or equations within data models during similarity analysis.

In some embodiments, the SR analysis engine can be further configured to generate information scores for each model to determine the distance between an analyzed data model and other data models. In some embodiments, the SR analysis engine implements an Akaike Information Criterion (AIC) evaluation to establish an information score. The SR analysis engine can be configured to calculate AIC and evaluate the result against other AIC scores for data models of the same type (e.g., same dependent variable) to determine which model better represents a set of data and/or another data model. According to one embodiment, AIC can be used by an SR system to quantify how accurately any model represents another model or models while favoring simplicity of the analyzed models.

In some implementations, conventional AIC scorings can be executed to establish a probabilistic fitting for how closely a model fits another. The AIC score also includes factors for how many expressions are in an evaluated solution, thus, the AIC score also weights how complex a given solution is based on the number of coefficients appearing in the solution. Selecting the model with the best AIC minimizes the Kullback-Leibler distance between the scored model and the data set/data model against which it is compared. According to one embodiment, AIC provides a metric to identify a model that has the best fit to the compared data/model favoring fewer parameters in the selected model.

According to some embodiments, respective information scores can be used to quantify the quality of a given model as compared to another model of the same type. (e.g., rank the quality of models that are similar based on variable x, rank the quality of models that are similar based on variable y, and rank the quality of models that are similar based on variable z). In some examples, model types can be defined on specific equations, properties of equations, and/or common dependent variables within equations.

As discussed, data model results can be ranked on an associated information score determined for each model. In some embodiments, specialized information scores can be generated to provide more accurate assessments of information scoring, accuracy of data models, complexity of a data model, and/or error ratings for data models. In some embodiments, the information scoring used to evaluate data model results can include an AIC score, but rather than conventional AIC which employs a squared-error and the number of free parameters (coefficients) of a model, the information score used in various embodiments can be determined from squared error with a linear combination of a number of coefficients and an additional complexity metric (e.g., complexity as determined in process 500). In one example, the number of coefficients for an equation is combined with the additional complexity metric to incorporate 50% of each value (although in other embodiments different weights can be given to participation of number of coefficients and the additional complexity metric).

In some implementations, a squared error value for an equation/model is weighted against the linear combination of the number of coefficients appearing in the equation/model and the complexity value determined from a sum of complexity values assigned to each operation in the equation/model.

Figure 10:
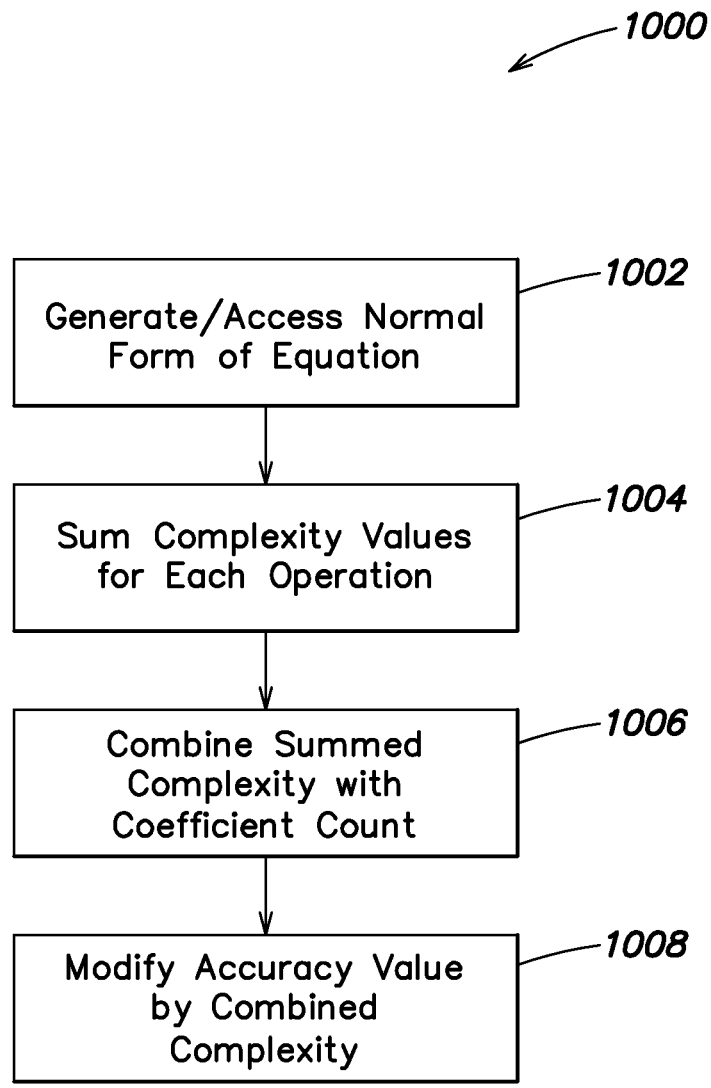
FIG. 10 is an example process flow for determining an information score for a data model, according to one embodiment.

Shown in FIG. 10 is an embodiment of an example process 1000 for determining an information score for a data model. Process 1000 begins with generation of, or access to, a normal form representation of an equation/model at 1002. Normal forms of equations can be generated by sorting, simplifying, de-duplicating operations and/or expressions, among other options. For example, process 500, discussed above, can include generation of a "normal" form of an equation. At 1004, a sum for complexity values of each operation in the normal form is generated. In some examples, the complexity value for an operation can be calculated from a series expansion of the operation/equations. In other examples, a complexity value can be assigned for all appearances of that operation, and in yet others user defined values can be used.

At 1006, the summed complexity value is combined with a co-efficient count generated for the equation/model to establish a combined complexity value. The combined complexity value is used to factor an equation/model's degree of complexity into a determination of the equation/model's accuracy. For example, an accuracy value can be modified at 1008 by the combined complexity value determined at 1006. In one example, a squared-error determination of accuracy is modified by the combined complexity of the equation/model to generate an information score.

According to some embodiments, employing a combination of number of coefficients and the additional complexity metric discussed can yield better information on complexity. In one particular example, nonlinear expressions can have effective degrees of freedom, even without free parameters. Thus, is some embodiments, the SR system can be configured to account for degrees of freedom in a nonlinear data model, yielding better determinations of information score.

In other embodiments, the SR system can also be configured to combine linear correlation with absolute error in order to generate an error metric for evaluating equations and/or data models. Conceptually, the SR system can be configured to determine an error metric that is more suitable for random expressions with very high error. In one embodiment, the system calculates a correlation coefficient if the data model is bad, and a direct error metric when the data model is good. To do this, the system can be configured to combine correlation and absolute error linearly and use the correlation value to interpolate between the two metrics. In one example, the SR system is configured to calculate a hybrid error metric that is constrained to be monotonic. The hybrid correlation coefficient metric can be defined as "$(1-r^2)*a+\min(a, err)$", where "r" is the Pearson correlation coefficient, "a" is a fixed constant (a=2 in our implementation), and "err" is a mean error metric (the mean absolute error in our implementation), normalized by the standard deviation of the dependent variable.

According to some embodiments, further details can be provided in addition to similarity, information score, and/or error metrics, for the related data sets identified as results and stored on the SR system (e.g., in database 108). For example, the origin information of a data model or data set in a set of similar data models can be captured and stored for later display. The origin information can include any one or more of: information on a previous submitter who uploaded their data for analysis, a public web address for a data set source, and contact information for a researcher associated with a data set source, among other examples. By providing data origin information, an SR system can facilitate interaction between various disciplines and/or researchers having related data.

According to another aspect, the SR system can implement a user interface that accepts data sets as inputs, generates representations of the input data set, and delivers related and/or similar data models and data sets responsive to search requests as a set of search results. The user interface can be configured to generate navigable displays conveying degree of similarity for sets of data models, and can further display information on why data models are similar. The navigable displays can be interactive, allowing, a user to select within the displays to access additional detail, additional information, and/or to filter a set of results being displayed. In some embodiments, the user interface can generate and render topographical maps representing three dimensional space in a two dimensional display.

Example Applications

According to one aspect, similarity analysis of data sets and/or data models can implemented in a variety of technological fields to assist in the understanding of natural systems, virtual systems, and/or simulated systems. In some embodiments, the application to the fields of mathematics can be derived from the description above. SR systems and/or engines can be used in mathematics to analyze systems that humans can provide insight into, further complex systems can be evaluated to determined similarity to other data models, even where the volume of data is so large that a human operator cannot direct analysis of the data.

In other aspects, properties of known data models can be used to extrapolate behavior and/or to extend processing associated with the known data models to new data models, for example, in response to determining similarity between a new data set (and its associated data model) and known data models. In one embodiment, data model similarity analysis can be used to identify testing protocols for validity drug treatments. For example, a data model generated on a new drug can reveal similarities to known drugs. The similarity analysis can be used to suggest treatment validation protocols for the new drug based on the treatment protocols used in the known (and determined similar) drugs.

In other embodiments, similar data models can be used to extrapolate behavior. Based on the similarity analysis, the behavior of a first data model and its underlying data set can be predicted based on the behavior of the similar data models. In one implementation, the performance data for stocks, stock markets, industry segments, can be used to generate a first data model. The first data model can be analyzed to determined similar data models. The similar data models can then be used to predict the future behavior for performance data associated with the first data model.

In still other embodiments, similar data models can likewise be used in consumer analytics. SR systems can be configured to identify properties of consumer populations based on observable and/or recordable data. Data models can be identified from consumer spending information, which can be determined similar to known data models. The known models can then be used to predict behavior patterns.

Example Computer Implementations

Various aspects and functions described herein, in accord with aspects of the present invention, may be implemented as hardware, software, or a combination of hardware and software executed on one or more computer systems. In some examples, execution engines (e.g., an SR engine and an SR analysis engine) can be implemented as software executing on hardware of a computer system. In others, various software components may be executed on the hardware to perform specific functions. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions discussed may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 9:
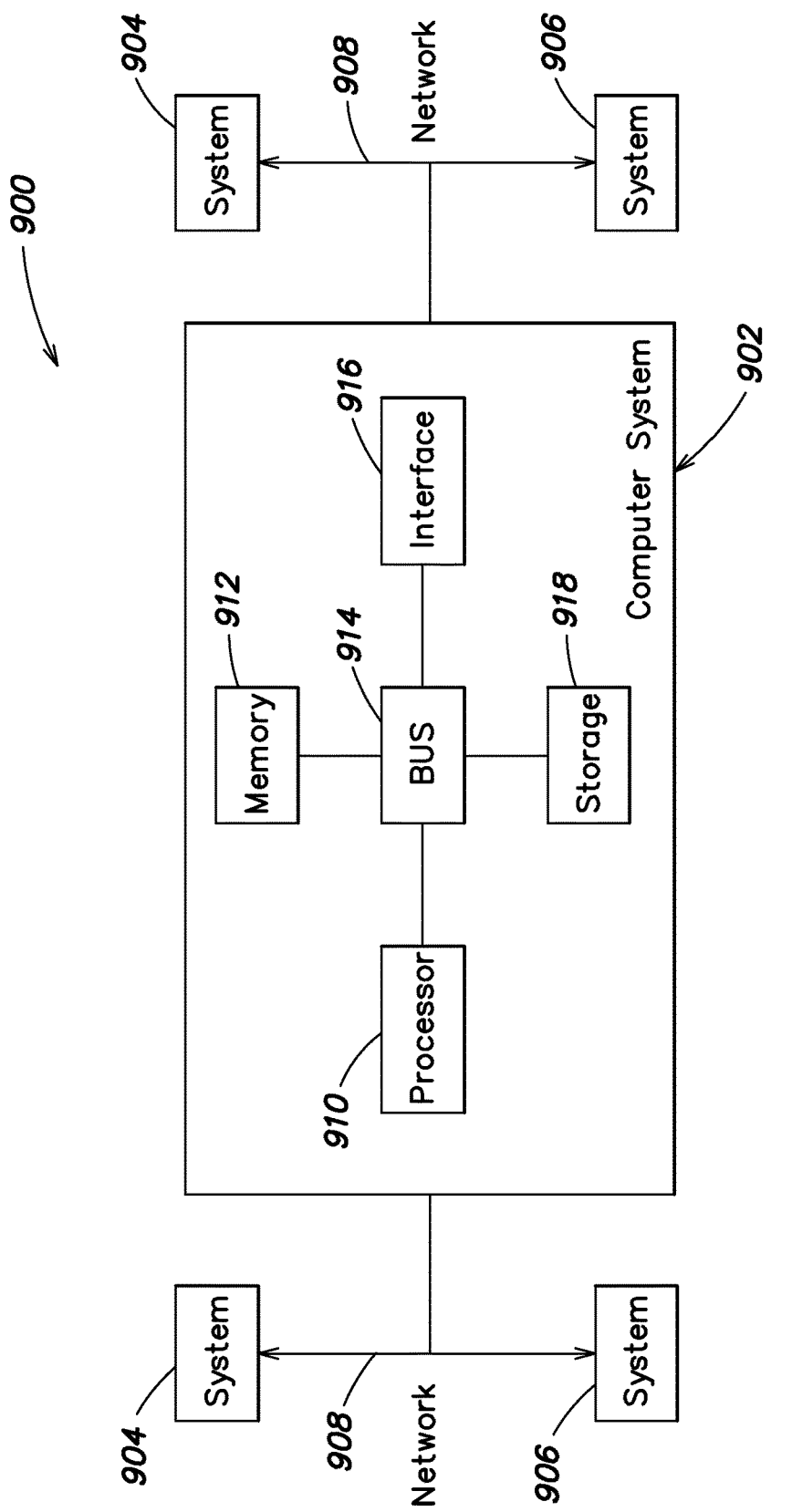
FIG. 9 is a block diagram of one example of a computer system that may be used to perform processes and functions disclosed herein.

FIG. 9 shows a block diagram of a distributed computer system 900, in which various aspects and functions in accord with the present invention may be practiced. The distributed computer system 900 may include one more computer systems. For example, as illustrated, the distributed computer system 900 includes three computer systems 902, 904 and 906. As shown, the computer systems 902, 904 and 906 are interconnected by, and may exchange data through, a communication network 908. The network 908 may include any communication network through which computer systems may exchange data. To exchange data via the network 908, the computer systems 902, 904, and 906 and the network 908 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 902, 904 and 906 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 904 and other computing devices in the network.

To ensure data transfer is secure, the computer systems 902, 904 and 906 may transmit data via the network 908 using a variety of security measures including TSL, SSL or VPN, among other security techniques. While the distributed computer system 900 illustrates three networked computer systems, the distributed computer system 900 may include any number of computer systems, networked using any medium and communication protocol.

Various aspects and functions in accord with the present invention may be implemented as specialized hardware or software executing in one or more computer systems including the computer system 902 shown in FIG. 9. As depicted, the computer system 902 includes a processor 910, a memory 912, a bus 914, an interface 916 and a storage system 918. The processor 910, which may include one or more microprocessors or other types of controllers, can perform a series of instructions that manipulate data. The processor 910 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 910 is connected to other system placements, including a memory 912, by the bus 914.

The memory 912 may be used for storing programs and data during operation of the computer system 902. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device, such as flash memory or phase-change memory (PCM). Various embodiments in accord with the present invention can organize the memory 912 into particularized and, in some cases, unique structures to perform the aspects and functions disclosed herein.

Components of the computer system 902 may be coupled by an interconnection element such as the bus 914. The bus 914 may include one or more physical busses (for example, busses between components that are integrated within a same machine), and may include any communication coupling between system placements including specialized or standard computing bus technologies such as IDE, SCSI, PCI and InfiniBand. Thus, the bus 914 enables communications (for example, data and instructions) to be exchanged between system components of the computer system 902.

Computer system 902 also includes one or more interfaces 916 such as input devices, output devices and combination input/output devices. The interface devices 916 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 916 allow the computer system 902 to exchange information and communicate with external entities, such as users and other systems.

Storage system 918 may include a computer-readable and computer-writeable nonvolatile storage medium in which instructions are stored that define a program to be executed by the processor. The storage system 918 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the storage system 918. The memory may be located in the storage system 918 or in the memory 912. The processor 910 may manipulate the data within the memory 912, and then copy the data to the medium associated with the storage system 918 after processing is completed. A variety of components may manage data movement between the medium and the memory 912, and the invention is not limited thereto.

Further, the invention is not limited to a particular memory system or storage system. Although the computer system 902 is shown by way of example as one type of computer system upon which various aspects and functions in accord with the present invention may be practiced, aspects of the invention are not limited to being implemented on the computer system, shown in FIG. 9. Various aspects and functions in accord with the present invention may be practiced on one or more computers having different architectures or components than that shown in FIG. 9. For instance, the computer system 902 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 902 may include an operating system that manages at least a portion of the hardware placements included in computer system 902. A processor or controller, such as processor 910, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

According to one embodiment, an SR analysis engine is implemented on a SR system. The SR analysis engine can be configured to generate information on data sets/models for displaying through an interactive portal including a search interface. According to some embodiments, the SR analysis engine is configured to analyze an input data set to generate a data model. Stated broadly, the SR analysis engine builds a description of the data set using a set of equations. The descriptive set of equations becomes the model of the data set. The SR analysis engine can be configured to use the data model to determine similarity to other data models.

In other embodiments, the SR analysis engine can also be configured to receive and analyze a data model directly. In some embodiments, the SR analysis engine can receive a processed data model from other components of an SR system or, in another example, a data model input into other components of an SR system.

In some embodiments, data models and/or the equations within the data model are evaluated on accuracy and complexity to determine an information score for the equations and/or data model. The SR analysis engine can be configured to automatically generate information scores for data models and/or equations within data models during similarity analysis. In some embodiments, determination of accuracy and complexity can be influenced by system configurable options. Criteria input into the system can specify preference towards data models/equations that are more accurate, less complex, and/or better balanced between accuracy and complexity (in one example, shifting the frontier used to identify/define the best equations for the model). By enabling modification of the scoring of data model, the system can be configurable to tailor the result set of data models and the identification of what or why they are similar.

In one embodiment, system additional settings can control the determination of complexity for an equation. For example, complexity can be determined based on transformation of an equation into a binary parse tree representation of the equation. (e.g., FIG. 8). In the illustrated example, root and internal nodes identify operators in the equation and leaf nodes identify variables and/or constants within the equation. The SR system and/or SR analysis engine assigns complexity values to each operation in the tree (e.g., add is set to 1, cos(x) is set to 3, division is set to 3, etc.) summing the complexity values of each operation/node in the tree. According to one embodiment, the SR analysis engine can automatically assign complexity value to each operation based on the series expansion of respective functions. The values assigned automatically by the SR system can be based on the first few terms of the series expansions, and the first few terms in the series expression used to generate a complexity value. In some implementations, operations being evaluated can also be assigned fixed complexity values (e.g., add can be set to 1, and multiply can be set to 2).

In other embodiments, the system can provide complexity values for equations that can be configurable by user. In other embodiments, different equation representations can be used, including, for example, acyclic graph representations of equations. In acyclic representations repeated sub-expressions in the equations are counted only once for determining complexity.

As discussed above, the SR analysis engine can be configured to analyze data sets to establish data models, for example, based on accuracy and complexity. The scoring of each equations and/or model can be stored (e.g., in a database) for later access. Additionally, the representations generated for each equations can be stored for subsequent analysis.

The SR analysis engine can then compare data models for similarities and/or relationships. In some embodiments, equations within models can be compared. The equations can be transformed into comparable representation of each equations during similarity analysis and/or during model generation (e.g., equations can be transformed into binary parse tree representations). In some further embodiments, the presence of variables within those representations can be used during the similarity analysis, while the specific value associated with each variable can be ignored.

In one embodiment, binary parse tree representations of equations are generated and analyzed. In some embodiments, each equation within a model is compared in a pair-wise fashion to other equations in a plurality of other data models. In further embodiments, each sub-expression within an equation can likewise be compared. In one example, the SR analysis engine is configured to execute a breadth first comparison between equations and sub-expressions in data models.

In some embodiments, the SR analysis engine can be further configured to generate information scores for each model reviewed to determine the distance between an analyzed data model and other data models. In some embodiments, the SR analysis engine implements an Akaike Information Criterion (AIC) evaluation. In others, the SR analysis engine calculates a modified AIC, based on a linear combination of number of coefficients and an additional complexity metric.

According to some embodiments, the information scores of each model can be used to quantify the quality of a given model as compared to another model of the same type. (e.g. rank the quality of models that are similar for variable x, rank the quality of models that are similar for models of variable y, and rank the quality of models that are similar for models of variable z). According to some embodiments, information scores can be calculated by the SR analysis engine based on the accuracy and complexity of a given model and/or equations.

The SR analysis engine can also be configured to generate information for graphical visualizations of the relationships between data models. In one embodiment, topographical mappings of related data sets can be generated and displayed in a user interface. In some examples, the user interface displays a navigable topographical map. The topographical map display can be rendered in an interactive user interface that accepts user selections.

According to some embodiments, further details can be provided on the related data sets identified as results in the user interface. For example, an SR analysis engine can be configured to provide the origin information of a related data model or data set. The information can be displayed in a user interface by selecting a specific node in a display. The origin information can include any one or more of: information on a previous submitter who uploaded their data for analysis, a public web address for a data set source, contact information for a researcher associated with a data set source, among other examples. By providing data origin information, an SR system and the user interface displays can facilitate interaction between various disciplines and/or researchers having related data.

Various aspects of an SR system can generate, organize, and display user interfaces within a web site over the Internet or through other communication networks connected to the SR system, wherein the user interface display can enable searching for related and/or similar data sets based on a data set input.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method comprising:
   with a computer-implemented data set search engine, performing:
      receiving, in a user interface, a first data set;
      generating a first data model associated with the first data set, the first data model including a first plurality of equations, each of the first plurality of equations representing a relationship among variables in the first data set;
      searching for data models similar to the first data model, including comparing the first data model with a plurality of data models, each of the plurality of data models being associated with a respective data set, the plurality of data models including a second data model associated with a second data set and including a second plurality of equations, each of the second plurality of equations representing a relationship among variables in the second data set, the comparing comprising:
         determining, based at least in part on the first plurality of equations and the second plurality of equations, a distance between the first data model and the second data model; and
         identifying, based on results of the comparing, a result set of data models similar to the first data model, the result set of data models including the second data model; and
      displaying, in the user interface, a visual representation of the result set of data models at least in part by displaying in the user interface an equation in the second plurality of equations that is representative of the second data model.

2. The method according to claim 1, wherein the first data set is received via a communication network.

3. The method according to claim 1, wherein generating the first data model comprises generating the first plurality of equations by using the first data set.

4. The method according to claim 1, wherein searching for data models similar to the first data model further comprises:
   evaluating a normal form of at least one equation in the first plurality of equations to determine a complexity value for the at least one equation.

5. The method according to claim 1, wherein searching for data models similar to the first data model further comprises:
   generating a normal form representation of at least one equation in the first plurality of equations.

6. The method according to claim 1, wherein searching for data models similar to the first data model further comprises:
   generating an information score for the first data model and the plurality of data models.

7. The method according to claim 1, wherein searching for data models similar to the first data model further comprises:
   generating an information score for at least some of data models in the result set of data models.

8. The method according to claim 7, wherein generating the information score for a particular data model includes determining an accuracy of the particular data model.

9. The method according to claim 8, wherein determining the accuracy of the particular data model includes determining a squared error metric for the particular data model.

10. The method according to claim 7, wherein generating the information score for a particular data model includes determining a complexity value for at least one expression in the particular data model.

11. The method according to claim 10, wherein determining the complexity value for the at least one expression includes summing complexity values associated with operations in the at least one expression.

12. The method according to claim 11, wherein generating the information score for the particular data model further includes an act of combining the sum of complexity values with a coefficient count of the at least one expression.

13. The method according to claim 10, wherein generating the information score for the particular data model includes determining an accuracy of the particular data model discounted by the complexity value.

14. The method according to claim 1, wherein determining the distance between the first data model and the second data model comprises analyzing, pair-wise, equations in the first plurality of equations in the first data model against equations in the second plurality of equations in the second data model.

15. The method according to claim 1, wherein determining the distance between the first data model and the second data model comprises counting a number of matching equations between the first plurality of equations and the second plurality of equations.

16. The method according to claim 15, wherein determining the distance between the first data model and the second data model further comprises:
   dividing the number of matching equations by a total number of possible matches.

17. The method according to claim 1, further comprising:
   predicting behavior of the first data model based on behavior of data models in the result set of data models.

18. The method according to claim 1, wherein the distance is one of a Euclidean distance, a Manhattan distance, a Kullback-Leibler distance, a Hellinger distance, a cosine difference, a Jaccard distance, a diversity difference, a Jenson-Shannon divergence, and a skew divergence.

19. The method of claim 1, wherein displaying the equation that is representative of the second data model comprises emphasizing one or more sub-expressions of the equation that match the first data model.

20. A system comprising:
   at least one computer hardware processor configured to perform operations of a data set search engine, including:
      receiving, in a user interface, a first data set;
      generating a first data model associated with the first data set, the first data model including a first plurality of equations, each of the first plurality of equations representing a relationship among variables in the first data set;

searching for data models similar to the first data model, including comparing the first data model with a plurality of data models, each of the plurality of data models being associated with a respective data set, the plurality of data models including a second data model associated with a second data set and including a second plurality of equations, each of the second plurality of equations representing a relationship among variables in the second data set, the comparing comprising:

determining, based at least in part on the first plurality of equations and the second plurality of equations, a distance between the first data model and the second data model; and identifying, based on results of the comparing, a result set of data models similar to the first data model, the result set of data models including the second data model; and displaying, in the user interface, a visual representation of the result set of data models at least in part by displaying in the user interface an equation in the second plurality of equations that is representative of the second data model.

21. The system according to claim 20, wherein the first data set is received via a communication network.

22. The system according to claim 20, wherein generating the first data model comprises generating the first plurality of equations by using the first data set.

23. The system according to claim 20, wherein the searching for data models similar to the first data model further includes evaluating a normal form of at least one equation in the first plurality of equations to determine a complexity value for the at least one equation.

24. The system according to claim 20, wherein searching for data models similar to the first data model further includes generating a normal form representation of at least one equation in the first plurality of equations.

25. The system according to claim 20, wherein searching for data models similar to the first data model further includes generating an information score for the first data model and the plurality of models.

26. The system according to claim 20, wherein searching for data models similar to the first data model further includes generating an information score for at least some data models in the result set of data models.

27. The system according to claim 26, wherein generating the information score for a particular data model includes determining an accuracy of the particular data model.

28. The system according to claim 27, wherein determining the accuracy of the particular data model includes determining a squared error metric for the particular data model.

29. The system according to claim 26, wherein generating the information score for a particular data model includes determining a complexity value for at least one expression in the particular data model.

30. The system according to claim 29, wherein generating the information score comprises summing complexity values associated with operations in the at least one expression.

31. The system according to claim 30, wherein generating the information score for the particular data model further comprises combining the sum of complexity values with a coefficient count of the at least one expression.

32. The system according to claim 29, wherein generating the information score for the particular data model includes determining an accuracy of the particular data model discounted by the complexity value.

33. The system according to claim 20, wherein determining the distance between the first data model and the second data model comprises analyzing, pair-wise, equations in the first plurality of equations in the first data model against equations in the second plurality of equations in the second data model.

34. The system according to claim 20, wherein determining the distance between the first data model and the second data model comprises counting a number of matching equations between the first plurality of equations and the second plurality of equations.

35. The system according to claim 20, wherein determining the distance between the first data model and the second data model comprises counting a number of matching equations between the first plurality of equations and the second plurality of equations.

36. The system according to claim 20, wherein the at least one computer hardware processor is further configured to predict behavior of the first data model based on behavior of data models in the result set of data models.

37. The system according to claim 36, wherein the behavior of data models includes at least one of a set of properties, simulations, sensitivities, statistics, model interpretations, ideal settings, and hyper parameters.

38. The system of claim 20, wherein generating the first data model comprises: generating a first binary parse tree for a first equation in the first plurality of equations; and storing the generated first binary parse tree.

39. The system of claim 38, wherein the second data model comprises a second binary parse tree for a second equation in the second plurality of equations, and wherein the distance between the first data model and the second data model is further determined based at least in part on the first binary parse tree and the second binary parse tree.

* * * * *